United States Patent
McKiou et al.

(10) Patent No.: US 8,923,887 B2
(45) Date of Patent: Dec. 30, 2014

(54) SOCIAL NETWORKING ON A WIRELESS COMMUNICATION SYSTEM

(75) Inventors: Kevin W. McKiou, Naperville, IL (US); Arun Sankisa, Chicago, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 1486 days.

(21) Appl. No.: 11/860,477

(22) Filed: Sep. 24, 2007

(65) Prior Publication Data
US 2009/0082038 A1    Mar. 26, 2009

(51) Int. Cl.
| H04M 3/42 | (2006.01) |
| H04W 24/00 | (2009.01) |
| H04W 4/00 | (2009.01) |
| G06Q 99/00 | (2006.01) |
| H04L 12/58 | (2006.01) |
| H04W 4/02 | (2009.01) |
| H04L 12/18 | (2006.01) |
| H04L 29/08 | (2006.01) |

(52) U.S. Cl.
CPC .......... *H04L 12/185* (2013.01); *H04L 12/5895* (2013.01); *H04W 4/028* (2013.01); *H04L 51/38* (2013.01); *H04L 67/18* (2013.01); *H04W 4/02* (2013.01)
USPC ...................... 455/456.3; 455/414.1; 455/416; 455/456.1; 455/466; 705/319

(58) Field of Classification Search
USPC ............... 455/456.1–457, 404.2, 412.1, 403, 455/422.1, 412, 414.1–414.2, 415–416, 455/418–420, 456.1–456.3, 456.5–456.6; 701/425–426, 438, 451, 516; 709/203, 709/22; 715/750–753, 758; 707/722, 707/724–725, 732–734, 736, 769, 784; 705/319
See application file for complete search history.

(56) References Cited

U.S. PATENT DOCUMENTS

| 7,373,109 | B2 * | 5/2008 | Pohja et al. ................. 455/456.3 |
| 7,729,709 | B1 * | 6/2010 | Loeb et al. .................. 455/456.3 |
| 7,890,581 | B2 * | 2/2011 | Rao et al. ....................... 709/204 |
| 2002/0115453 | A1 * | 8/2002 | Poulin et al. .................. 455/456 |
| 2004/0192350 | A1 * | 9/2004 | Pelaez et al. ............... 455/456.3 |
| 2005/0135305 | A1 * | 6/2005 | Wentink ......................... 370/329 |
| 2007/0149222 | A1 * | 6/2007 | Hodko et al. ................. 455/461 |
| 2007/0281716 | A1 * | 12/2007 | Altman et al. ................ 455/466 |
| 2007/0282621 | A1 * | 12/2007 | Altman et al. .................... 705/1 |
| 2008/0039121 | A1 * | 2/2008 | Muller et al. .............. 455/456.3 |
| 2008/0086261 | A1 * | 4/2008 | Robinson et al. ............. 701/200 |
| 2008/0098313 | A1 * | 4/2008 | Pollack ......................... 715/753 |

* cited by examiner

*Primary Examiner* — Meless Zewdu
(74) *Attorney, Agent, or Firm* — Duft Bornsen & Fettig, LLP

(57) ABSTRACT

Wireless communication systems and methods are described that provide location-based social networks to mobile communication devices. Mobile users of the wireless communication system define social networking profiles storing characteristics of the user. The wireless communication system determines a location of a user's mobile communication device and identifies a set of other mobile users that are geographically proximate to the user. The wireless communication system then filters the set of other mobile users based on characteristics of the social networking profiles of the other mobile users, and transmits identifiers of the filtered set of other mobile users to the user's mobile communication device. The mobile communication device then displays the identifiers of the filtered set of other mobile users to the user allowing the user to initiate contact with any of the other mobile users that are of interest.

20 Claims, 11 Drawing Sheets

*FIG. 6*

| USER | GENDER | AGE | RELATIONSHIP STATUS |
|---|---|---|---|
| Mobile user 110 | F | 29 | Single |
| Mobile user 601 | M | 38 | Married |
| Mobile user 602 | M | 25 | Single |
| Mobile user 603 | M | 21 | Single |
| Mobile user 604 | M | 32 | Single |
| Mobile user 605 | M | 35 | Married |
| Mobile user 606 | M | 45 | Single |
| Mobile user 607 | M | 33 | Single |
| Mobile user 608 | M | 37 | Single |
| Mobile user 609 | M | 43 | Single |
| Mobile user 610 | M | 27 | Single |

*FIG. 9*

| USER | GENDER | AGE | AGE SEARCH CRITERIA |
|---|---|---|---|
| Mobile user 110 | F | 29 | 30-40 |
| Mobile user 901 | M | 38 | 35-40 |
| Mobile user 902 | M | 31 | 25-31 |
| Mobile user 903 | M | 33 | 30-35 |
| Mobile user 904 | M | 35 | 18-35 |
| Mobile user 905 | M | 32 | 27-32 |
| Mobile user 906 | M | 37 | 35-40 |
| Mobile user 907 | M | 40 | 18-40 |
| Mobile user 908 | M | 30 | 25-30 |
| Mobile user 909 | M | 34 | 23-28 |
| Mobile user 910 | M | 36 | 32-36 |

| USER | MEMBER OF PRIVATE CHANNEL ABC |
|---|---|
| Mobile user 110 | YES |
| Mobile user 1101 | YES |
| Mobile user 1102 | NO |
| Mobile user 1103 | YES |
| Mobile user 1104 | YES |
| Mobile user 1105 | NO |
| Mobile user 1106 | NO |
| Mobile user 1107 | NO |
| Mobile user 1108 | YES |
| Mobile user 1109 | NO |
| Mobile user 1110 | YES |

SOCIAL NETWORKING ON A WIRELESS COMMUNICATION SYSTEM

RELATED APPLICATIONS

This patent application is related to a co-pending patent application having the Ser. No. 10/953,740, filed on Sep. 29, 2004, which is incorporated herein by reference. This patent application is also related to a co-pending patent application having the Ser. No. 11/317,144, filed on Dec. 23, 2005, which is incorporated herein by reference. This patent application is also related to a co-pending patent application having the Ser. No. 11/617,148, filed on Dec. 28, 2006, which is incorporated herein by reference.

BACKGROUND OF THE INVENTION

1. Field of the Invention

The invention is related to the field of communications, and in particular, to providing location-based social networks in a wireless communication system.

2. Statement of the Problem

Cellular phones, PCS phones, and other mobile wireless data devices have become very popular due to the conveniences that they provide to people. Wireless devices have become compact in size, which make them easy and convenient to carry. People routinely carry their cell phones or wireless PDAs with them on their belt, in their pocket, in their purse, etc, so they are available for use at any time.

Because of the large demand for wireless voice and data services, service providers strive to offer new services to present and potential customers. Some exemplary services are text messaging, digital pictures, web browsing, etc. A new trend for service providers is to provide location-based services. The location-based services provide information to a mobile user based on the location of the mobile user. For instance, the location-based services may send informational text messages to the user's phone, such as information on the weather, information on traffic reports, advertisements, etc, based on the location of the user. Another location-based service allows a user to identify and/or communicate with other individuals, groups and businesses in his/her vicinity or another geographic area.

While location-based services allow users to identify other individuals in their proximity, these location-based services lack the capacity to allow users to search for and identify other individuals having certain specified characteristics. Instead, these location-based services typically provide a user with a list of all individuals in the immediate vicinity of the user. The user may want to further narrow the list to view people matching specified search criteria of the user. For example, a single male may want to identify single females in the area within a specified age bracket. The male user may want to further narrow the search to identify single females having certain specified characteristics (e.g., similar hobbies). Likewise, a single female may only want her identity to be provided to a male matching her specified search criteria. Thus, it is a problem that present wireless communication systems don't provide social networking services which allow users to identify other individuals in their vicinity matching specified criteria of the user.

SUMMARY OF THE SOLUTION

The invention solves the above problems and other problems with methods and systems for providing social networking on a wireless communication system. Mobile users of the wireless communication system define individual social networking profiles. The social networking profile may store certain characteristics regarding the user, such as their gender, age, physical characteristics, interests, etc. The social networking profile may optionally store search criteria of the user which defines types of individuals that may contact the user or types of individuals that the user is looking to find. Based on the location of the mobile communication device of a searching user, a set of other mobile users of the social network is identified that are geographically proximate to the searching user. The other mobile users that are identified are filtered based on characteristics of the social networking profiles of each of the other mobile users to form a social network in the geographic proximity of the searching user, and identifiers or information on the filtered mobile users is transmitted to the mobile communication device of the searching user. The mobile communication device may then display the information on the other mobile users, allowing the searching user to initiate contact with one or more of the other mobile users that are of interest to the searching user.

One exemplary embodiment of the invention comprises a content system for providing location-based social networks for mobile communication devices. The content system comprises a profile storage system adapted to store social networking profiles for mobile users of a wireless communication system. The content system further comprises a processing system adapted to identify a location of a mobile communication device of a first mobile user, identify a set of second mobile users in a geographic area proximate to the first mobile user based on the location of the mobile communication device, and filter the set of second mobile users based on characteristics of the social networking profiles of the second mobile users to define a social network. The social network is defined around the geographic area of the first mobile user. The content system further comprises a transmission system adapted to transmit identifiers of the filtered set of second mobile users to the mobile communication device of the first mobile user. The first mobile user may then view the second mobiles users in his/her vicinity and that match certain characteristics desired by the first mobile user.

The invention may include other exemplary embodiments described below.

DESCRIPTION OF THE DRAWINGS

The same reference number represents the same element or same type of element on all drawings.

FIG. 6 illustrates a list of identified mobile users in an exemplary embodiment of the invention.

FIG. 9 illustrates a filtered set of mobile users matching the first search criteria of a mobile user in an exemplary embodiment of the invention.

DETAILED DESCRIPTION OF THE INVENTION

FIGS. 1-12 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below may be combined in various ways to form multiple variations of the invention. As a result, the invention is not limited to the specific embodiments described below, but only by the claims and their equivalents.

Figure 1:
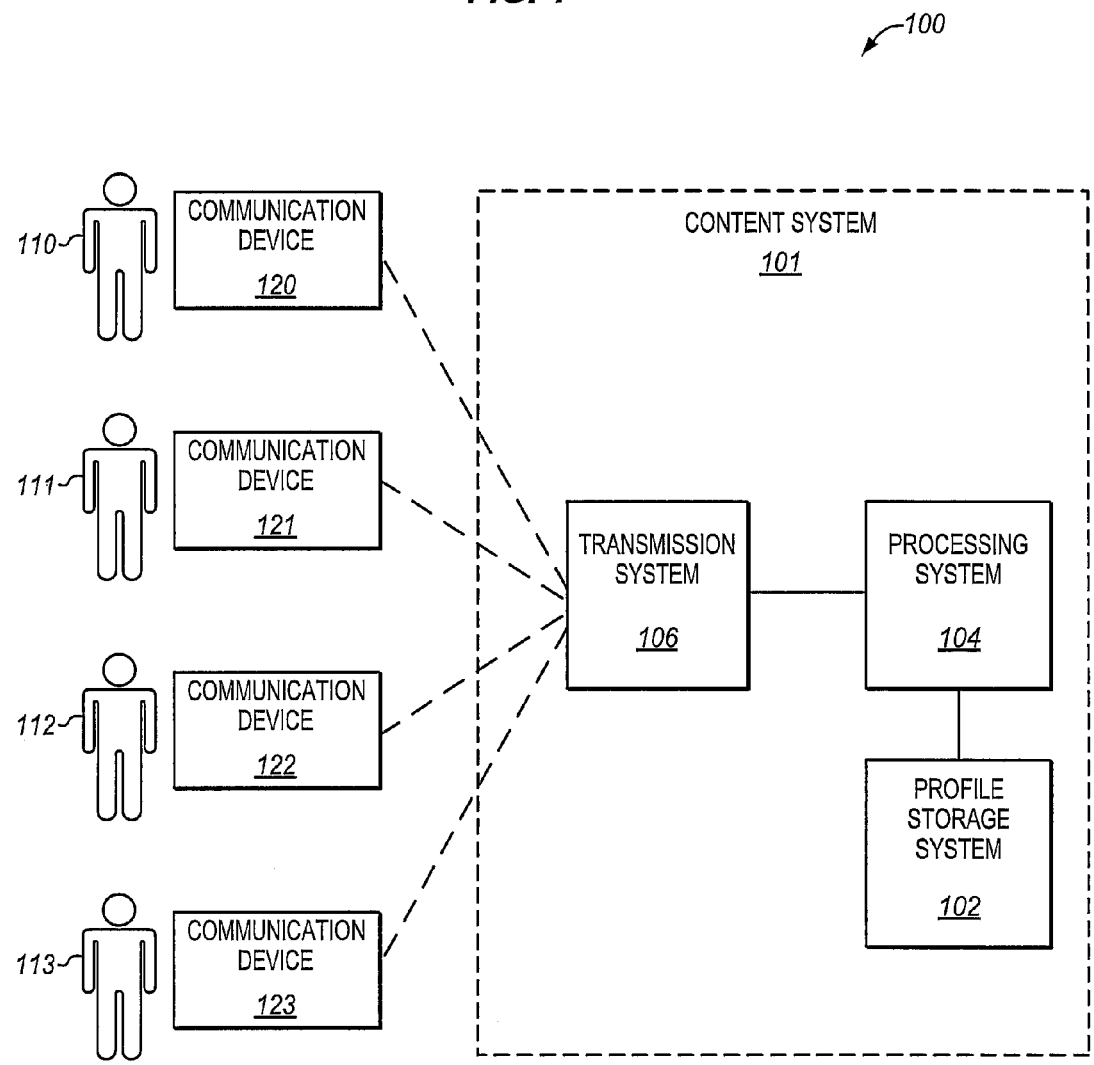
FIG. 1 illustrates a wireless communication system for providing location-based services in an exemplary embodiment of the invention.

FIG. 1 illustrates a wireless communication system 100 for providing location-based services in an exemplary embodiment of the invention. More particularly, wireless communication system 100 is adapted to provide location-based social networking services to mobile users 110-113 of wireless communication system 100. Wireless communication system 100 comprises any wireless communication system for providing voice and/or data communications in a mobile or nomadic fashion, such as a cellular network, a PCS network, etc.

As used herein, a social network refers to a community of mobile users 110-113 who share characteristics, interests or activities, or who are interested in finding other individuals who have specific characteristics, interests or activities. The objective of a social network is to allow a mobile user to learn about other mobile users of the social network with an objective of identifying characteristics of interest. A social network may provide various techniques for users to interact, including chat, messaging, e-mail, video, voice communication, file sharing, blogging or discussion groups or other types of message forums. Thus, users may indicate an interest in another user with the objective of establishing a mutual social interaction while able to maintain a comfortable level of privacy. Further, a user may advertise their own characteristics of interest so that they are visible to other users who enter the proximity of the user's location.

To facilitate the interaction among mobile users 110-113, each mobile user 110-113 defines a social networking profile. The social networking profile includes information describing the user for the purpose of joining a social network through a mobile communication device. Such information may include physical characteristics (gender, height, weight, eye color, hair color, etc) of the user, a biography or description of the user, interests, activities or hobbies of the user, etc. Photos and/or videos of the user may also be included in the social networking profile. In some embodiments, the social networking profile of a particular mobile user may include search criteria regarding other types of users that this particular mobile user would like to locate and/or meet, and/or types of users that are permitted to contact this particular mobile user. The social networking profile may further provide means of contacting the user, including text messaging, email, instant messaging, phone, etc.

Wireless communication system 100 includes a content system 101 adapted to provide content to mobile users 110-113. Content system 101 includes a profile storage system 102, a processing system 104, and a transmission system 106. Profile storage system 102 comprises any system, server, or function adapted to store a social networking profile for mobile users 110-113. Each mobile user 110-113 may be identified by some type of identifier, such as a username, telephone number, user identification number, a digital picture, etc.

Processing system 104 refers to a single processing device or a group of inter-operational processing devices. The operation of processing system 104 may be controlled by instructions executable by processing system 104. Some examples of instructions are software, program code, and firmware. Processing system 104 may be any type of processing system adapted to generate or provide content responsive to requests from mobile users 110-113. These requests may include requests by a mobile user 110-113 to search for other mobile users 110-113, view profiles of other mobile users 110-113, edit the social networking profile of a mobile user 110-113, etc. In some embodiments, processing system 104 may be adapted to provide communication services, such as email, instant messaging, etc, between mobile users 110-113.

Transmission system 106 comprises any system, server, or function adapted to transmit content to mobile communication devices 120-123 of mobile users 110-113 responsive to requests from mobile users 110-113. Transmission system 106 may also be adapted to receive information from users, such as connection requests, dynamic location information, location updates, etc. Transmission system 106 may include one or more base stations (not shown), a Mobile Switching Center (MSC) (not shown), and/or one or more other network nodes (not shown). Transmission system 106 is configured to provide wireless service to a plurality of communication devices 120-123. Transmission system 106 may communicate with communication devices 120-123 using Code Division Multiple Access (CDMA), Time Division Multiple Access (TDMA), Global System for Mobile Communication (GSM), Universal Mobile Telecommunications System (UMTS), 802.11 WiFi, BlueTooth (Registered), satellite, packet radio, or any other wireless protocol. Wireless communication system 100 may include other elements, devices or components not illustrated for sake of brevity.

Figure 2:
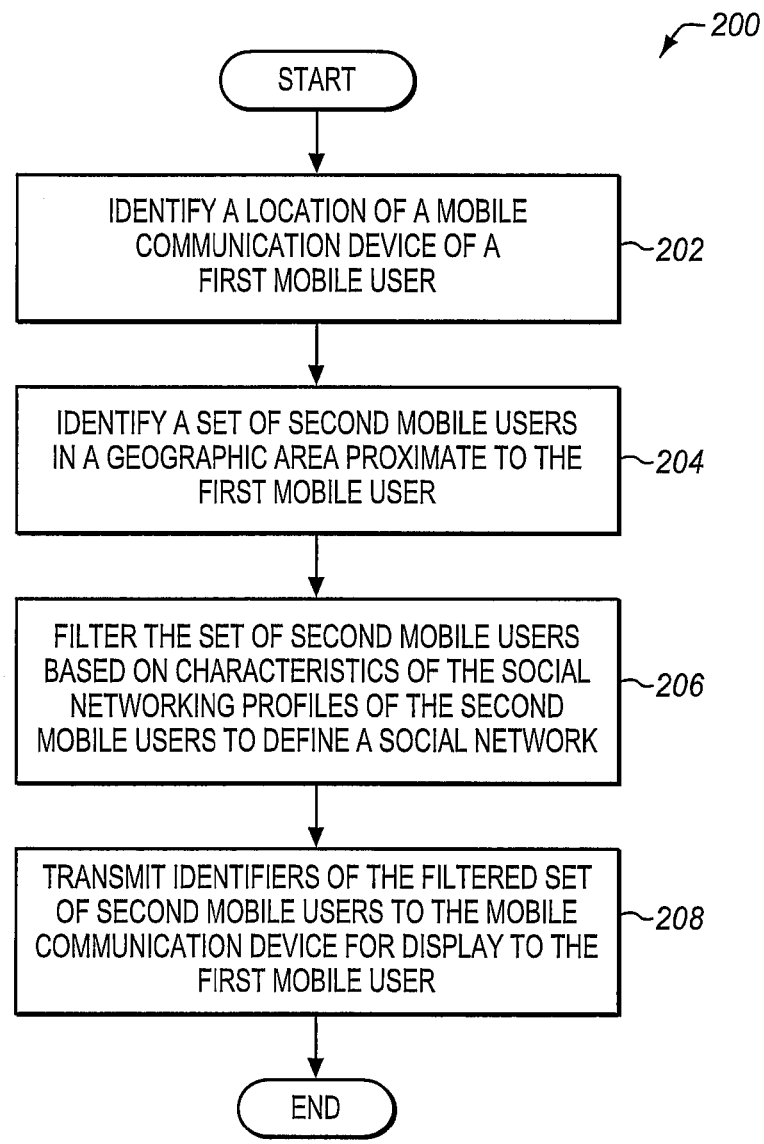
FIG. 2 is a flow chart illustrating a method of providing location-based social networks for a mobile communication device in an exemplary embodiment of the invention.

Assume for this embodiment that mobile user 110 subscribes to a location-based social network service and wants to view other users of interest in his/her geographic vicinity. As an example, mobile user 110 may be located in a night club and wants to view other users that are in the night club that share similar interests or fit a particular profile. FIG. 2 illustrates how wireless communication system 100 allows mobile user 110 to view other users of interest.

FIG. 2 is a flow chart illustrating a method 200 of providing location-based social networks for mobile communication devices in an exemplary embodiment of the invention. The steps of method 200 will be described with reference to wireless communication system 100 in FIG. 1. The steps of the flow chart in FIG. 2 are not all-inclusive and may include other steps not shown.

In step 202 of method 200, processing system 104 of content system 101 identifies a location of mobile communication device 120 of mobile user 110. The location of mobile communication device 120 may be identified based on geographic information provided by mobile communication device 120, or by components of transmission system 106. For example, processing system 104 may identify the location of mobile communication device 120 as $1^{st}$ and Main St. based on relative or absolute GPS/geographical coordinates provided by mobile communication device 120.

In step 204, processing system 104 identifies a set of other mobile users in a geographic area proximate to mobile user 110 based on the location of mobile communication device 120. A set of other mobile users may be zero, one, or more other mobile users identified to be in a geographic area proximate to mobile user 110. Assume for this embodiment that the set of other mobile users includes mobile users 111-113 that are geographically proximate to mobile user 110.

The proximity size of the search may be based on factors defined by processing system 104 or mobile user 110. Processing system 104 will then search for other users within the defined proximity of mobile user 110. The proximity size of the search may be pre-defined by processing system 104 for each search. For example, processing system 104 may identify users within a one block radius of mobile user 110. Alternatively, mobile user 110 may define the proximity size of the search in a request to processing system 104. For example, mobile user 110 may request to identify other mobile users within a one block radius of their present geographic location, within a one mile radius of their present location, within the same establishment, etc.

The proximity of the search may also vary based on the geographic location of mobile user 110. For example, in a densely populated area, the geographic size of the search may be relatively small (e.g., one block), but in a less densely populated area, the geographic size of the search may be relatively larger (e.g., 5 miles). The geographic area of the search may also be based on the number of users identified by the search. Processing system 104 may be adapted to identify a maximum number of other mobile users (e.g., 20 users) to identify. For example, processing system 104 may be adapted to identify the 20 closest mobile users. During one search, these mobile users may all be located within a one quarter mile of mobile user 110, and during another search at a different time, these mobile users may all be located within one half mile of mobile user 110. It will be appreciated that other factors, such as time of day, may also be utilized to define the geographic size of the search performed for mobile user 110.

In step 206, processing system 104 filters the set of other mobile users 111-113 identified in the previous step based on characteristics of the social networking profiles of the other mobile users 111-113. As previously stated, each mobile user 111-113 has defined a social networking profile that includes personal characteristics describing the mobile user. After processing system 104 identifies the other mobile users 111-113 that are located proximate to mobile user 110, processing system 104 additionally filters the other mobile users 111-113 based on their social networking profile and the social networking profile of mobile user 110 to define a social network. Processing system 104 thus attempts to identify other mobile users 111-113 that match some type of interests of mobile user 110. Mobile user 110 and the other mobile user 111-113 form a social network relating to the present geographic location of mobile user 110. The social network may be pre-defined with mobile user 110 and the other mobile users 111-113 having previously joined the social network in some manner. Step 206 thus identifies those members of the social network that are geographically proximate to mobile user 110. Alternatively, the social network may be created ad-hoc at the location of mobile user 110.

As an example of filtering the set of other mobile users 111-113 based on the social networking profiles, mobile user 110 may desire to identify single mobile users of the opposite gender and initiate social interaction with these mobile users. Assume that mobile user 110 is a single male seeking a single female. If mobile user 111 is a single female, mobile user 112 is a single male, and mobile user 113 is a single female, then processing system 104 may filter the set of other mobile users 111-113 to include mobile users 111 and 113, and exclude mobile user 112.

In step 208, transmission system 106 transmits identifiers of the filtered set of other mobile users (e.g., transmits information on mobile users 111 and 113) to mobile communication device 120 of mobile user 110. Mobile communication device 120 is then able to display or otherwise present the identifiers of the filtered set of other mobile users to mobile user 110. The identifiers may comprise usernames, telephone numbers, user identification numbers, digital pictures, etc.

Figure 3:
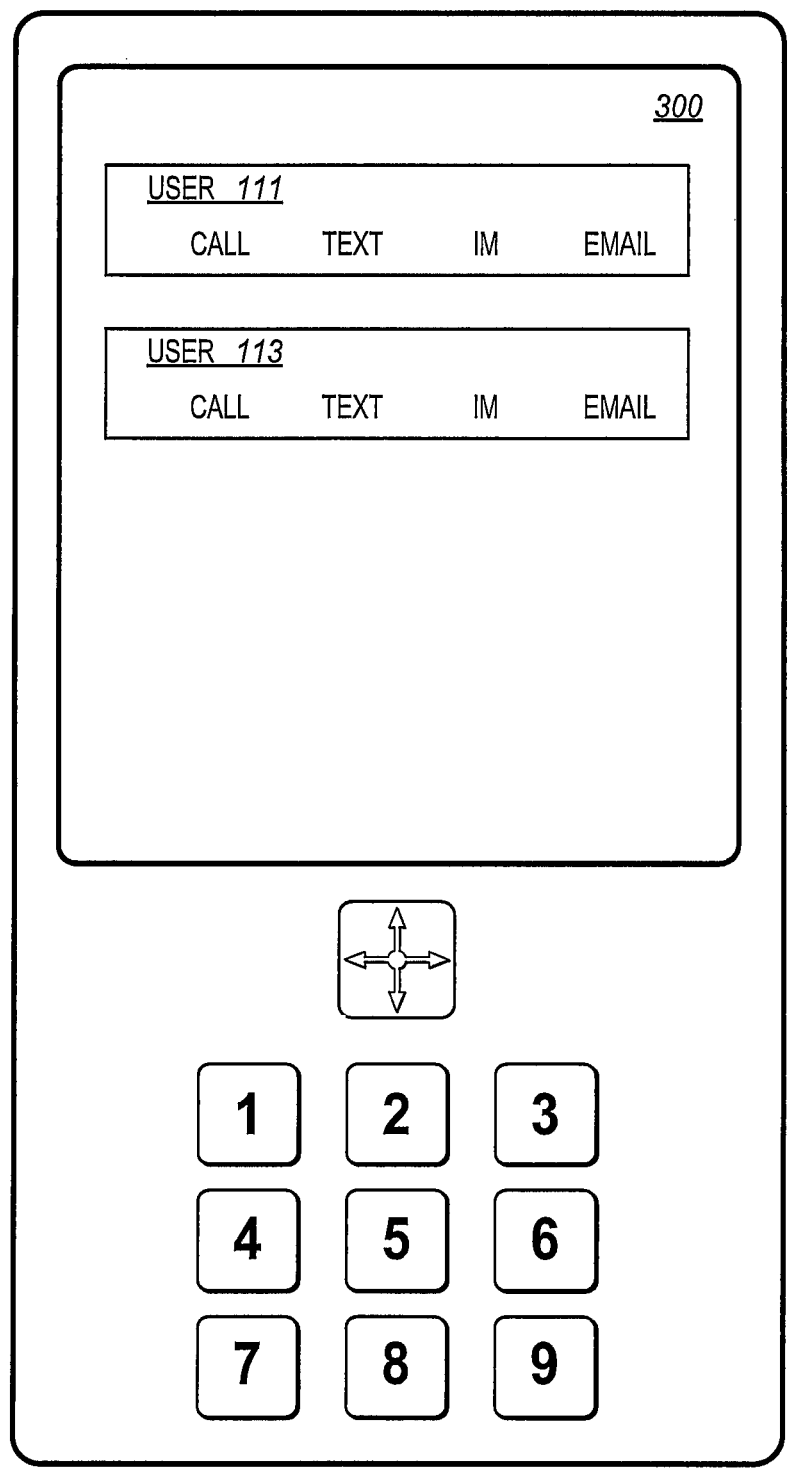
FIG. 3 illustrates a screen shot of a mobile communication device of FIG. 1 in an exemplary embodiment of the invention.

FIG. 3 illustrates a screen shot 300 of mobile communication device 120 (see FIG. 1) displaying the filtered set of other mobile users in an exemplary embodiment of the invention. It will be appreciated that mobile communication device 120 may be adapted to display the "search results" and social network data in any number of ways. For example, a simple presentation of a list with a thumbnail picture and brief profile information of each identified user may be presented on mobile communication device 120. Mobile user 110 may then click on a link in the list to view more information (e.g., the entire social networking profile) regarding a specific user of the social network. Alternatively, each identified user may be placed on a relative grid or map where a thumbnail picture and brief profile pop up when the user icon is touched by a cursor, pointer, etc.

In one embodiment of the invention, transmission system 106 (see FIG. 1) may be further adapted to retrieve the social networking profile of one or more of the other mobile users 111-113 being displayed from profile storage system 102, and provide the profile to mobile communication device 120 for presentation to mobile user 110.

Figure 4:
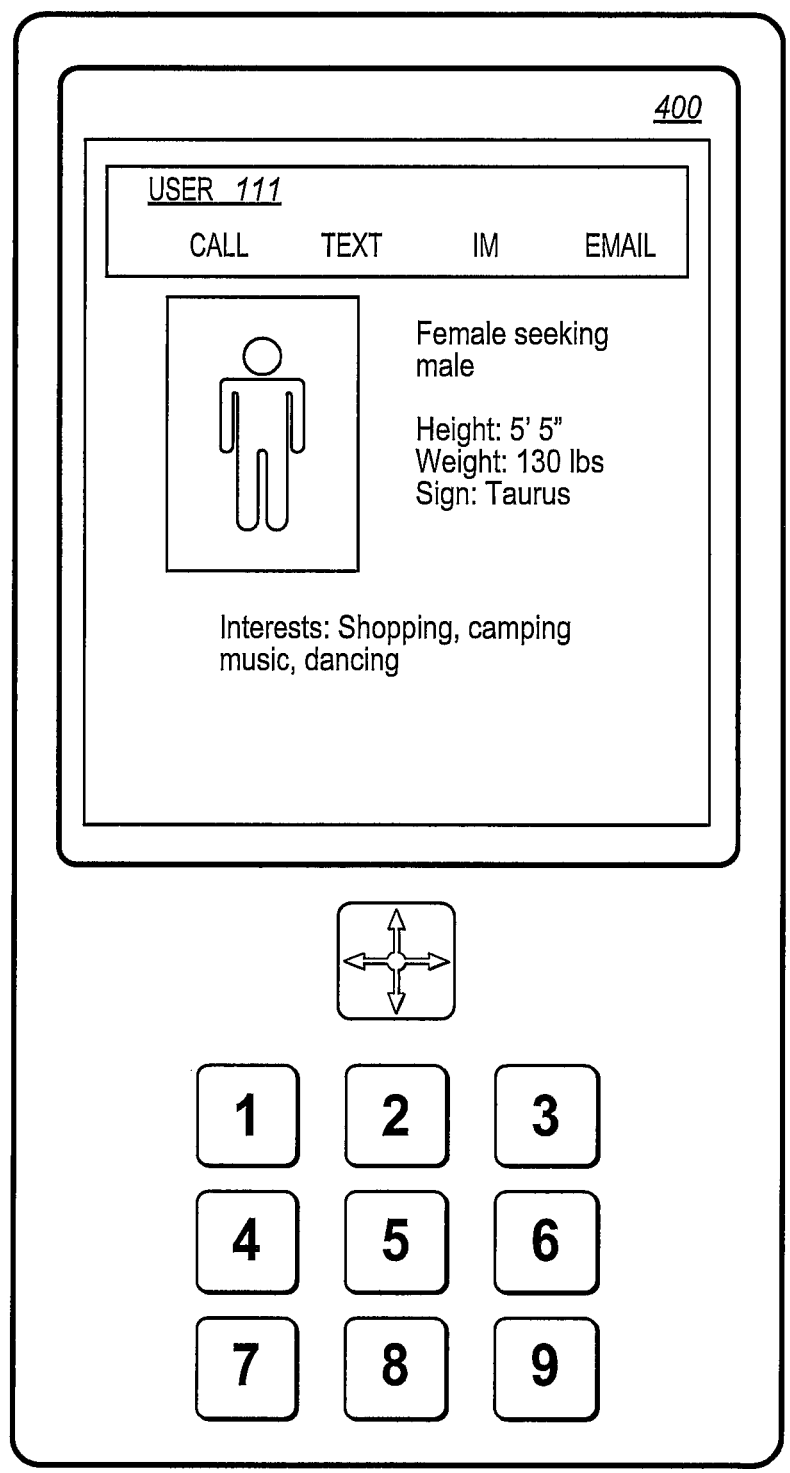
FIG. 4 illustrates another screen shot of a mobile communication device of FIG. 1 in an exemplary embodiment of the invention.

FIG. 4 illustrates a screen shot 400 of mobile communication device 120 (see FIG. 1) displaying a social networking profile of mobile user 111 in an exemplary embodiment of the invention. In the illustrated embodiment of FIG. 4, mobile user 110 (see FIG. 1) may initiate various types of communication with mobile user 111, including voice communication, text messaging, instant messaging and email.

Figure 5:
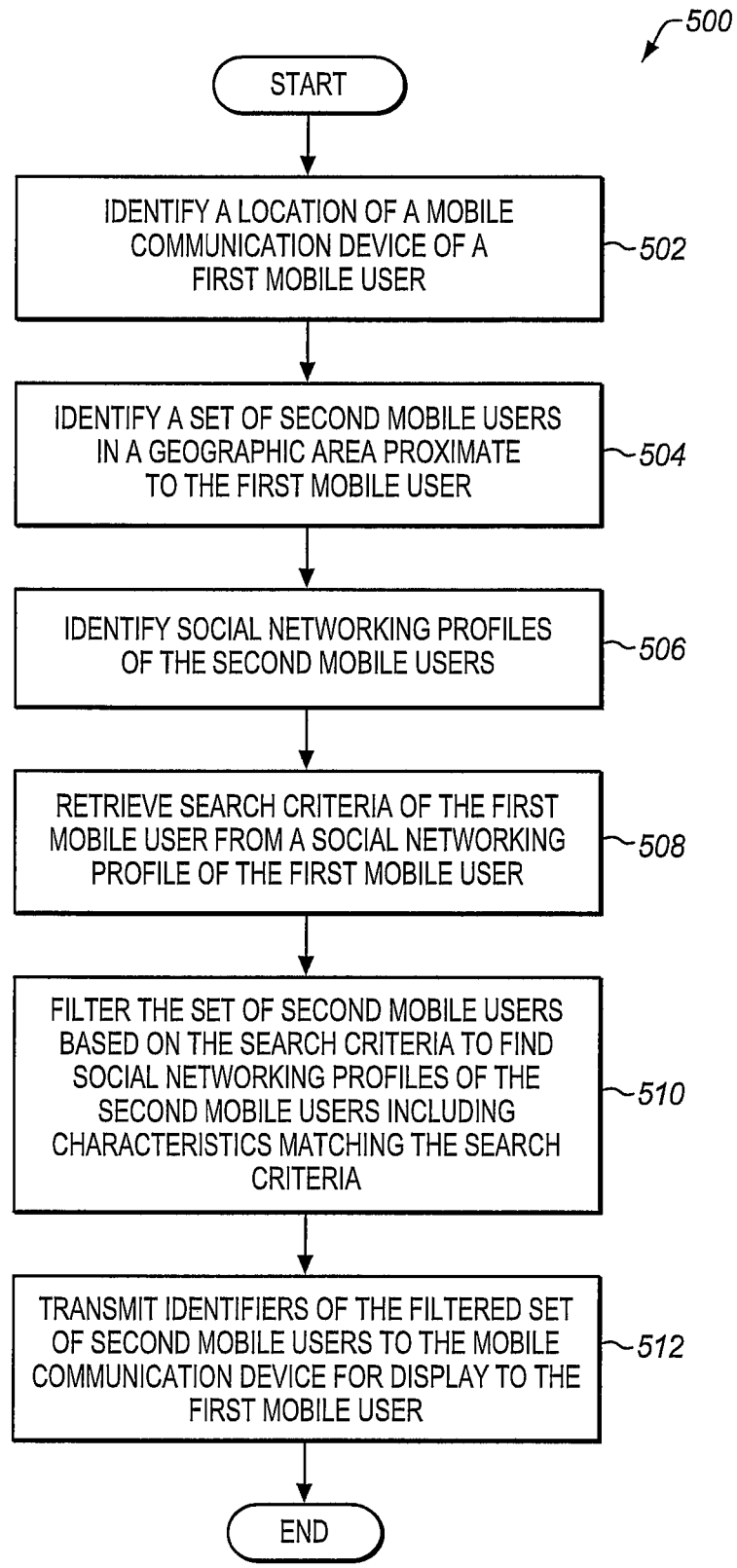
FIG. 5 is a flow chart illustrating a method of locating mobile users of a wireless communication system based on defined search criteria in an exemplary embodiment of the invention.

It may be desirable for mobile user 110 to have the ability to define search criteria identifying types of users that they desire to locate. The search criteria may comprise characteristics of the social networking profile of mobile user 110. FIG. 5 is a flow chart illustrating a method 500 of locating mobile users of a wireless communication system based on defined search criteria in an exemplary embodiment of the invention. The steps of method 500 will be described with reference to wireless communication system 100 in FIG. 1. The steps of the flow chart in FIG. 5 are not all-inclusive and may include other steps not shown.

In step 502, processing system 104 identifies a location of a mobile communication device 120 of a mobile user 110. The identification of the location of mobile communication device 120 may be performed as described in step 202 of FIG. 2. Step 504 comprises identifying a set of other mobile users in a geographic area proximate to mobile user 110 based on the location of mobile communication device 120. The identification of the set of other mobile users may be performed as described in step 204 of FIG. 2. For example, assume that processing system 104 identifies a set of other mobile users 601-610 (see FIG. 6) in the geographic area proximate to mobile user 110.

In step 506, processing system 104 identifies social networking profiles of the other mobile users 601-610 (see FIG. 6). Processing system 104 retrieves the social networking profile of the other mobile users 601-610 from profile storage system 102. In step 508, processing system 104 retrieves search criteria of mobile user 110 from a social networking profile of mobile user 110. Processing system 104 retrieves the social networking profile of mobile user 110 from profile storage system 102. The search criteria of mobile user 110 may comprise characteristics desired by mobile user 110. Mobile user 110 may modify these characteristics based on types of users that mobile user 110 desires to locate.

In step 510, processing system 104 filters the set of other mobile users 601-610 based on the search criteria to find social networking profiles of the other mobile users 601-610 that have characteristics matching the search criteria of mobile user 110. For example, assume that mobile user 110 is a single female seeking a single male between the ages of 30-40. FIG. 6 illustrates a list of other mobile users 601-610 identified in step 504 in an exemplary embodiment of the invention. The list in FIG. 6 includes the gender, relationship status (e.g., single vs. married) and age of each of the other mobile users 601-610. According to this list, mobile user 604 and mobile user 607 match the search criteria of mobile user 110 (i.e., mobile user 604 and mobile user 607 are single males between the ages of 30 and 40). Thus, mobile user 604 and mobile user 607 will be included in the filtered set of other mobile users identified by processing system 104.

Figure 7:
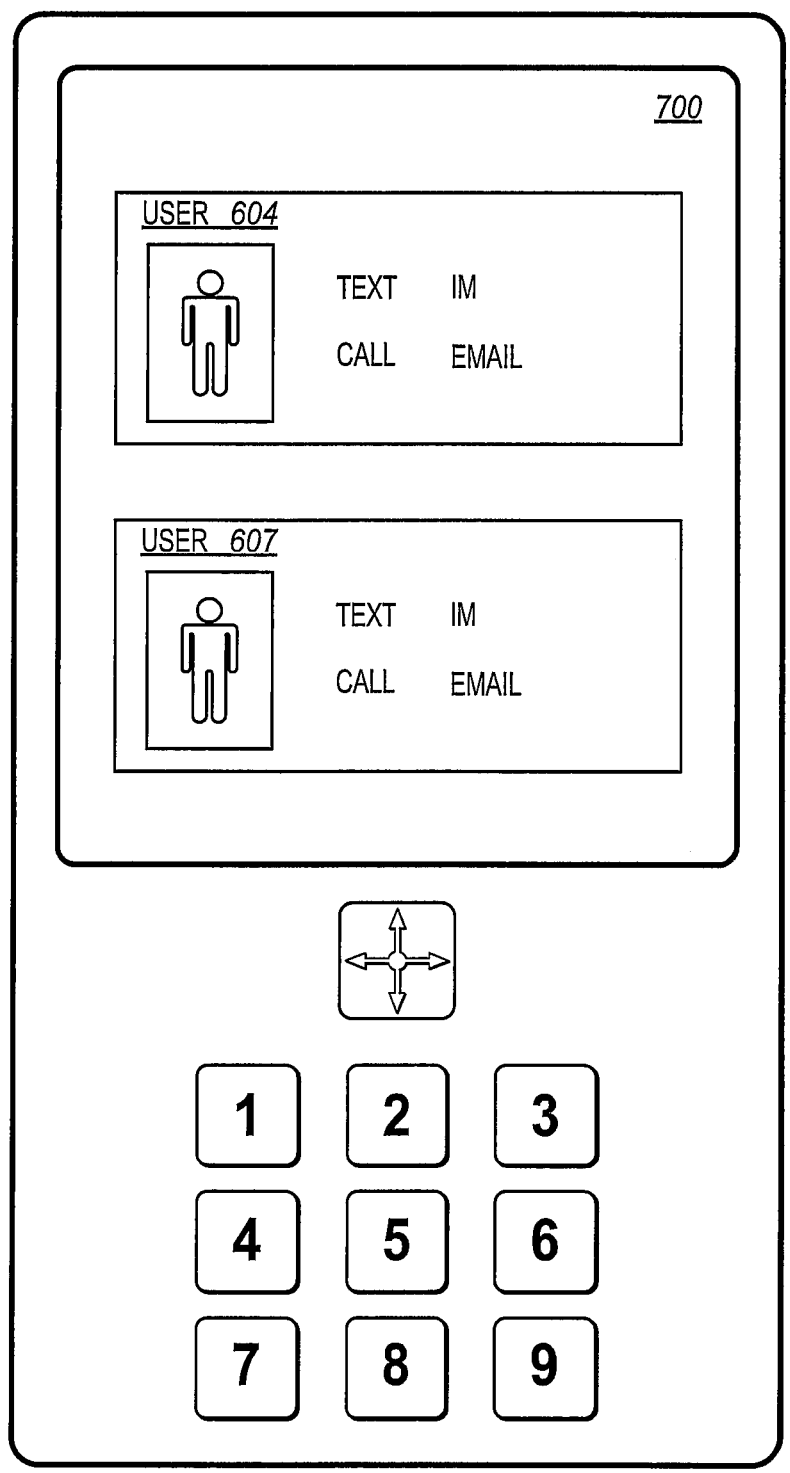
FIG. 7 illustrates a screen shot of a mobile communication device of FIG. 1 displaying a filtered set of mobile users in an exemplary embodiment of the invention.

In step 512, transmission system 106 transmits identifiers of the filtered set of other mobile users 604 and 607 to mobile communication device 120 for presentation to mobile user 110. The transmission process may be performed as described in step 208 of FIG. 2. FIG. 7 illustrates a screen shot 700 of mobile communication device 120 (see FIG. 1) displaying the filtered set of other mobile users 604 and 607 in an exemplary embodiment of the invention. Mobile user 110 may then initiate communication with either or both of mobile users 604 and 607 or view the social networking profiles of mobile users 604 and 607 using the provided links associated with each mobile user.

The filtering process of step 510 may also be performed based on search criteria of mobile users 601-610 to ensure that mobile user 110 is a match for each of mobile users 601-610 identified by the filtering process of step 510. In other words, mobile user 110 does not see a profile of another mobile user 601-610 unless characteristics of the social networking profile of mobile user 110 match the search criteria of a mobile user 601-610.

Figure 8:
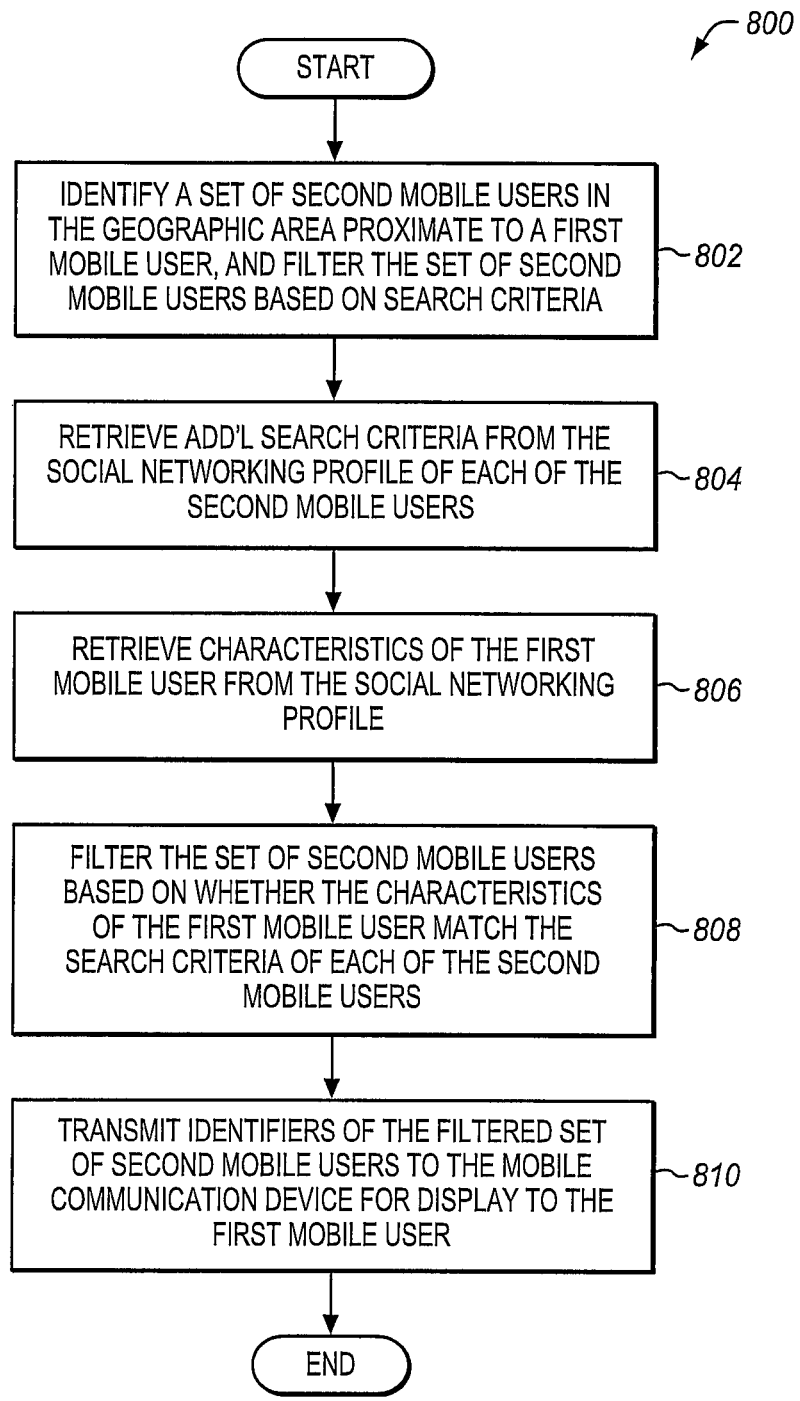
FIG. 8 is a flow chart illustrating a method of locating mobile users of a wireless communication system based on defined search criteria in an exemplary embodiment of the invention.

FIG. 8 is a flow chart illustrating a method 800 of locating mobile users of a wireless communication system based on defined search criteria in an exemplary embodiment of the invention. The steps of method 800 will be described with reference to wireless communication system 100 in FIG. 1. The steps of the flow chart in FIG. 8 are not all-inclusive and may include other steps not shown.

In step 802, processing system 104 identifies a set of other mobile users in the geographic area proximate to mobile user 110. Processing system 104 also filters the set of other mobile users based on search criteria of mobile user 110 to identify social networking profiles of the other mobile users that include characteristics matching the search criteria. For example, assume that mobile user 110 is a single female seeking a single male between the ages of 30 and 40. FIG. 9 illustrates a filtered set of other mobile users 901-910 matching the search criteria of mobile user 110 (e.g., mobile user 901-910 is a single male between the ages of 30 and 40).

In step 804, processing system 104 retrieves additional search criteria from the social networking profile of each of the other mobile users 901-910. FIG. 9 illustrates the search criteria of each mobile user 901-910 indicating the age of a female that each mobile user is seeking. While the search criteria are illustrated as ages for mobile users 901-910, it will be appreciated that any type of characteristic, including physical characteristics, interests, etc., may be utilized. Further, it will be appreciated that mobile users 901-910 may each define different types of search criteria than defined by mobile user 110. For example, mobile user 110 may define an age search criteria, while mobile user 903 may define a height or weight search criteria. Further, mobile user 909 may define an interest search criteria (e.g., football).

In step 806, processing system 104 retrieves the characteristics of mobile user 110 from the social networking profile of mobile user 110. In the described example, the characteristic of mobile user 110 retrieved from profile storage system 102 is the age (e.g., 29) of mobile user 110.

In step 808, processing system 104 filters the set of other mobile users 901-910 based on whether the characteristics of mobile user 110 match the search criteria of each of the other mobile users 901-910. Referring to FIG. 9, all of mobile users 901-910 match the search criteria of mobile user 110 (e.g., mobile users 901-910 are males between the ages of 30 and 40). However, mobile user 110 only matches the search criteria of mobile users 902, 904, 905, 907 and 908 (i.e., mobile user 110 is only within the age limits defined by these mobile users). Thus, processing system 104 generates a filtered set of other mobile users comprising mobile users 902, 904, 905, 907 and 908. Identifiers for this filtered set of other mobile users are then transmitted by transmission system 106 to mobile communication device 120 for presentation to mobile user 110 in step 810. Because mobile user 110 does not match the search criteria of mobile users 901, 903, 906, 909 and 910, the social networking profiles of these users will not be presented to mobile user 110. Advantageously, processing system 104 identifies and presents a set of mobile users 902, 904, 905, 907 and 908 to mobile user 110 which are the most likely matching social networking profiles for mobile user 110 based on search criteria of both mobile users.

It will be appreciated that filtering may also be performed based on other information, such as "buddy lists", "buddy invitations", "crush lists", "avoid lists" or "stalker lists", etc. Thus, a mobile user may define these lists so that they are alerted when one of the mobile users on these lists enters their geographic location. Referring back to FIG. 9, mobile user 110 may add any of mobile users 902, 904, 905, 907 and 908 to one of these lists. If mobile user 110 was unable to immediately initiate communication with mobile users 902, 904, 905, 907 and 908 at the present time, then mobile user 110 may be alerted in the future when one of mobile users 902, 904, 905, 907 and 908 again enters a geographic location proximate to mobile user 110.

Wireless communication system 100 may also be adapted to provide private networking services to the members of the social network. Private networking allows a user to define a private channel of the social network that is isolated from the general communications of the social network. It can be configured so that all participants in the private network are visible regardless of their location, or it may be configured so that only participants in proximity of each other can see one another. All participants may have the same communication facilities available to other types of users.

Private networking is built on the capabilities used to implement general location-based service communications. Users of a private network may be given authorization to participate in a particular private channel based on defined criteria. These participants in the private network may be given a unique key (e.g., scrambling code, login and password) to make their communications visible only to participants of the private network. If it is desired for all participants to be visible to each other regardless of location, then all participant identities and location information may be broadcast to all sectors in which the participants of the private channel have a presence.

Figure 10:
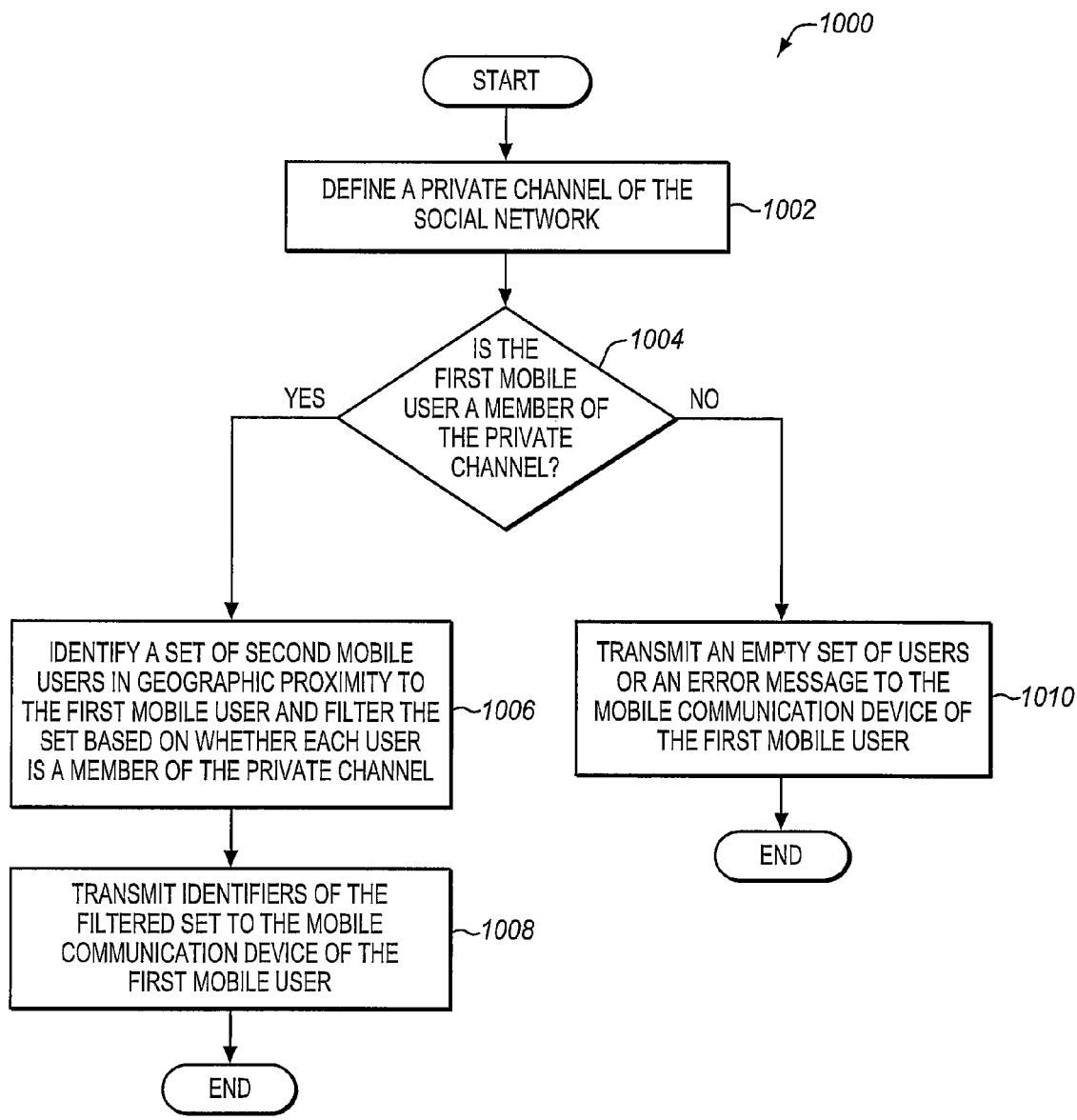
FIG. 10 is a flow chart illustrating a method of providing private networking for a social network in an exemplary embodiment of the invention.

FIG. 10 is a flow chart illustrating a method 1000 of providing private networking for a social network of a wireless communication system in an exemplary embodiment of the invention. The steps of method 1000 will be described with reference to wireless communication system 100 in FIG. 1. The steps of the flow chart in FIG. 10 are not all-inclusive and may include other steps not shown.

In step 1002, processing system 104 defines a private channel for the social network. As used herein, a private channel is a group of the social network requiring authorization for mobile users to participate in the private channel. The private channel may be defined by an administrator of the social network, or by one of the mobile users 110-113 of the social network.

In step 1004, processing system 104 determines whether a mobile user (e.g., mobile user 110) is a member of the private channel. The determination may be made based on information or characteristics of the social networking profile of mobile user 110. For example, the members of the private channel may comprise employees of a company, and membership in the private channel may be based on whether mobile user 110 has a corporate email address.

In step 1006, processing system 104 identifies a set of other mobile users in geographic proximity to mobile user 110 responsive to determining that mobile user 110 is a member of the private channel. Processing system 104 also filters the set of other mobile users based on whether each of the other mobile users is a member of the private channel. In step 1008, transmission system 106 transmits identifiers of the filtered set of other mobile users to mobile communication device 120 for presentation to mobile user 110.

Alternatively, if processing system 104 determines that mobile user 110 is not a member of the private channel in step 1004, then transmission system 106 transmits an empty set of users or an error message to mobile communication device 120 for presentation to mobile user 110 in step 1010.

Figures 11, 12:
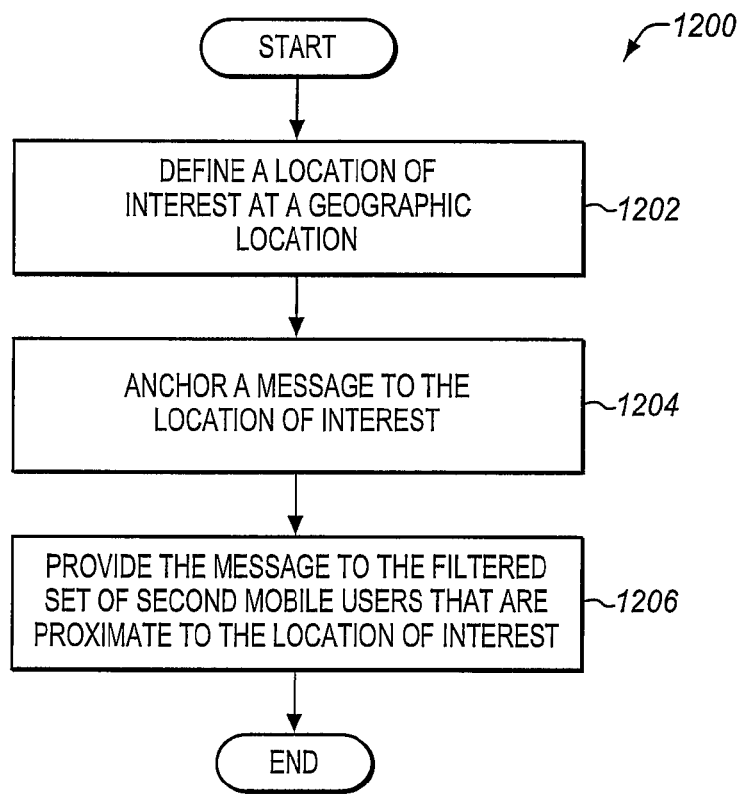
FIG. 11 illustrates an exemplary set of, second mobile users in geographic proximity to a first mobile user in an exemplary embodiment of the invention.
FIG. 12 is a flow chart illustrating a method of providing location-based services at a location of interest in an exemplary embodiment of the invention.

For example, assume that mobile user 110 is a member of a private channel for ABC Company. FIG. 11 illustrates an exemplary set of mobile users 1101-1110 in geographic proximity to mobile user 110 in an exemplary embodiment of the invention. FIG. 11 further illustrates which mobile users 1101-1110 are members of the private channel for ABC Company. Referring to FIG. 11, processing system 104 identifies mobile users 1101, 1103, 1104, 1108 and 1110 as members of the private channel, and provides this information to mobile communication device 120. Mobile communication device 120 may display a map or grid to mobile user 110 identifying the present geographic locations of mobile users 1101, 1103, 1104, 1108 and 1110. Mobile user 110 may then utilize mobile communication device 120 to initiate communication with any of mobile users 1101, 1103, 1104, 1108 and 1110.

In another embodiment of the invention, mobile user 110 may define a private channel in real time for a specific task or a specific duration. Mobile user 110 may define which users are members of the private channel and thus members of the social network. The filtering processes of step 206 of FIG. 2, step 510 of FIG. 5, or step 1006 of FIG. 10 may then be performed based on whether a mobile user is a member of the private channel. After the task is completed, or the duration of the private channel expires, then the private channel is dismantled.

Private channels allow a mobile user to monitor and direct the activities of a group of individuals participating in a coordinate activity or mission. For example, the users may be participating in an emergency or rescue activities. The private channel allows wireless communication system 100 (see FIG. 1) to provide services associated with a coordinated activity or mission, such as unicast and broadcast audio, data and video communication, dynamic location updates on participants, archiving of communications for later retrieval and analysis, etc. These dynamically created private channels may be implemented through a hierarchy or may be implemented using decision devolution allowing the collective members to make decisions rather than a ruling entity. Thus, all participants may be allowed to communicate with each other regardless of their location.

Messages for a private channel may be anchored to a specific location, such that a member of the private channel receives a communication responsive to entering the proximity of an anchored location. Messages may also be limited to a predetermined schedule and location, such that different locations receive different messages at different times. In the case where private channel communications may be time sensitive (e.g., during emergency situations), transmission system 106 (see FIG. 1) may be adapted to give the private channel communications priority.

As discussed above, messages may be defined for a location of interest of the social network at a physical location. FIG. 12 is a flow chart illustrating a method 1200 of providing location-based services at a location of interest in an exemplary embodiment of the invention. The steps of method 1200 will be described with reference to wireless communication system 100 in FIG. 1. The steps of the flow chart in FIG. 12 are not all-inclusive and may include other steps not shown.

In step 1202, processing system 104 defines a location of interest at a geographic location. A location of interest may be permanent (exists until it is destroyed) or it may only exist for a limited period of time (e.g., deployed by a user to broadcast a time sensitive message). A location of interest may be defined based on user input from a mobile user (i.e., may be defined by a mobile user). The perceived location associated with a location of interest may be fixed or it may move as defined by the service parameters.

In step 1204, processing system 104 anchors a message to the location of interest. For example, processing system 104 may receive input from a mobile user comprising a message to be anchored to the location of interest. The message may identify that a meeting for a social club is at restaurant XYZ, and may be anchored to a highway exit near the restaurant. The message may comprise a text message, a multimedia message, a digital picture, etc. Processing system 104 may also or alternatively anchor a service to the location of interest. For example, processing system 104 may anchor music, a video, a banner pop up, etc, to the location of interest.

In step 1206, transmission system 106 provides or transmits the message or the service to a filtered set of mobile users that are proximate to the location of interest. The filtering may be performed based on any criteria defined by mobile user 110, processing system 104 or characteristics of the social networking profile of other mobile users 111-113.

For example, mobile user 110 may provide information relating to a football party at a restaurant. The message may be targeted at fans of a specific football team, and may be anchored to the location of the restaurant. Thus, mobile user 110 may define that the message be transmitted to users of the social network that have that specific football team listed as an interest in their social networking profile. When a mobile user (e.g., mobile user 111) having that particular football team as an interest enters the geographic proximity of the restaurant, then transmission system 106 transmits the message to the mobile user 111. Advantageously, mobile user 111 can visit the restaurant and interact socially with other fans of their favorite football team.

Alternatively, mobile user 110 may define a message with directions to a party at an intersection located near the party. The message may instruct mobile users to turn in a specific direction at the intersection and proceed to the party. The intersection defines a location of interest of the social network. The message may be further defined for delivery to members of a buddy list of mobile user 110. Thus, when a member of the buddy list of mobile user 110 enters the proximity of the location interest, they will receive directions to the party.

Although specific embodiments were described herein, the scope of the invention is not limited to those specific embodiments. Further, while the embodiments described herein are directed specifically at social networks providing dating services, it will be appreciated that any type of social network may utilize the embodiments described herein. The scope of the invention is defined by the following claims and any equivalents thereof.

We claim:

1. A method for providing location-based social networks for mobile communication devices, the method comprising:
    identifying a location of a mobile communication device of a first mobile user;
    identifying a set of second mobile users that are in a geographic area proximate to the location;
    filtering the set of second mobile users by:
        identifying first search criteria provided by a social networking profile of the first mobile user; and
        removing second mobile users from the set based on whether they match the first search criteria;
    defining a social network by:
        for each second mobile user of the filtered set:
            identifying second search criteria provided by a social networking profile of the second mobile user;
            determining whether the first mobile user matches the second search criteria; and
            removing the second mobile user from the filtered set if the first mobile user does not match the second search criteria;
    receiving a message from the mobile communication device;
    determining a location of interest that is distinct from the location of the mobile communication device; and
    providing the message to members of the filtered set of second mobile users that are proximate to the location of interest.

2. The method of claim 1 wherein:
    the location of interest is indicated by at least one identifier selected from the group comprising street addresses and business names.

3. The method of claim 1 wherein the second search criteria includes physical characteristics.

4. The method of claim 1 wherein the second search criteria includes interests of a second mobile user.

5. The method of claim 1 further comprising:
    defining a private channel for the defined social network; and
    determining whether the first mobile user is a member of the private channel;
    wherein said filtering the set of second mobile users further comprises filtering the set of second mobile users based on whether each of the second mobile users is a member of the private channel.

6. The method of claim 1 further comprising:
    receiving input from the first mobile user defining a private channel; and
    receiving input from the first mobile user, adding at least one of the second mobile users as a member of the private channel;
    wherein said filtering the set of second mobile users further comprises filtering the set of second mobile users based on whether each of the second mobile users is a member of the private channel.

7. The method of claim 1 further comprising:
    providing the message to members of the defined social network that become proximate to the location of interest over a limited period of time.

8. The method of claim 7 further comprising:
    anchoring a service to the location of interest; and
    providing the anchored service to the members of the defined social network that are proximate to the location of interest.

9. A content system for providing location-based social networks, the content system comprising:
    a profile storage system adapted to store social networking profiles for mobile users;
    a processing system adapted to:
        identify a location of a mobile communication device of a first mobile user;
        identify a set of second mobile users that are in a geographic area proximate to the location;
        filter the set of second mobile users by:
            identifying first search criteria provided by a social networking profile of the first mobile user; and
            removing second mobile users from the set based on whether they match the first search criteria;
        define a social network by:
            for each second mobile user of the filtered set:
                identifying second search criteria provided by a social networking profile of the second mobile user;
                determining whether the first mobile user matches the second search criteria; and
                removing the second user from the filtered set if the first mobile user does not match the second search criteria;
        process a message from the mobile communication device; and
        determine, based on the message, a location of interest that is distinct from the location of the mobile communication device; and
    a transmission system adapted to provide a message to members of the filtered set of second mobile users that are proximate to the location of interest.

10. The content system of claim 9 wherein:
the location of interest is indicated by at least one identifier selected from the group comprising street addresses and business names.

11. The content system of claim 9 wherein the second search criteria includes physical characteristics.

12. The content system of claim 9 wherein the second search criteria includes interests of a second mobile user.

13. The content system of claim 9 wherein the processing system is further adapted to:
define a private channel for the defined social network;
determine whether the first mobile user is a member of the private channel; and
filter the set of second mobile users based on whether each of the second mobile users is a member of the private channel.

14. The content system of claim 9 wherein the processing system is further adapted to:
receive input from the first mobile user defining a private channel;
receive input from the first mobile user authorizing at least one of the second mobile users as a member of the private channel; and
filter the set of second mobile users based on whether each of the second mobile users is a member of the private channel.

15. The content system of claim 9 wherein the processing system is further adapted to:
provide the message to members of the defined social network that become proximate to the location of interest over a limited period of time.

16. The content system of claim 15 wherein the processing system is further adapted to:
anchor a service to the location of interest; and
provide the anchored service to members of the defined social network that are proximate to the location of interest.

17. A method for providing location-based social networks, the method comprising:
identifying a location of a mobile communication device of a first mobile user, wherein the first mobile user has a social networking profile;
identifying a set of second mobile users in a geographic area proximate to the location, wherein each of the second mobile users have a social networking profile;
identifying social networking profiles of the second mobile users;
retrieving a first search criteria of the first mobile user from the social networking profile of the first mobile user;
filtering the set of second mobile users by:
for each second mobile user of the set:
identifying second search criteria provided by the social networking profile of the second mobile user;
determining whether the first mobile user matches the second search criteria; and
removing the second mobile user from the set if the first mobile user does not match the second search criteria;
defining a social network by:
identifying first search criteria provided by the social networking profile of the first mobile user; and
removing second mobile users from the filtered set based on whether they match the first search criteria;
receiving a message from the mobile communication device;
determining a location of interest that is distinct from the location of the mobile communication device; and
providing the message to members of the filtered set of second mobile users that are proximate to the location of interest.

18. The method of claim 17 further comprising:
transmitting a social networking profile of at least one of the second mobile users to the mobile communication device for display to the first mobile user.

19. The method of claim 18 wherein the social networking profiles of the second mobile users include physical characteristics.

20. The method of claim 17, wherein the first search criteria comprises physical characteristics.

\* \* \* \* \*